United States Patent
Wu et al.

(10) Patent No.: US 8,428,514 B2
(45) Date of Patent: Apr. 23, 2013

(54) ASYMMETRIC AND ASYNCHRONOUS ENERGY CONSERVATION PROTOCOL FOR VEHICULAR NETWORKS

(75) Inventors: Shan-Hung Wu, Taoyuan (TW); Chung-Min Chen, Taipei (TW); Ming-Syan Chen, Taipei (TW)

(73) Assignee: Telcordia Applied Research Center Taiwan, Co., Taipei (TW)

( * ) Notice: Subject to any disclaimer, the term of this patent is extended or adjusted under 35 U.S.C. 154(b) by 913 days.

(21) Appl. No.: 12/466,902

(22) Filed: May 15, 2009

(65) Prior Publication Data

US 2010/0290378 A1 Nov. 18, 2010

(51) Int. Cl.
*H04B 7/00* (2006.01)

(52) U.S. Cl.
USPC .......................................... 455/41.2; 455/445

(58) Field of Classification Search .................. 370/328, 370/329, 338, 341, 395.2, 400–402, 406; 455/41.2, 445
See application file for complete search history.

(56) References Cited

U.S. PATENT DOCUMENTS

| | | | |
|---|---|---|---|
| 8,144,717 B2 * | 3/2012 | Blange et al. .................. 370/402 |
| 2009/0285140 A1 * | 11/2009 | Kim et al. ...................... 370/311 |
| 2010/0110930 A1 * | 5/2010 | Kohvakka et al. ............. 370/254 |

OTHER PUBLICATIONS

D. Audino, F. Baronti, R. Roncella, and R. Saletti. Wireless audio communication network for in-vehicle access of infotainment services in motorcycles, In Proc. of Personal,—Indoor and Mobile Radio Communications Symp., pp. 1-5, 2006.
P. Basu, N. Khan, and T.D.C. Little, A mobility based metric for clustering in mobile ad hoc networks, In Proc. of ICDCSW, pp. 413-418, 2001.
T. Gandhi and M.M. Trivedi. Pedestrian protection systems: Issues, survey, and challenges, IEEE Transactions on Intelligent Transportation Systems, 8(3):413-430, 2007.
S. Biswas, R. Tatchikou, and F. Dion. Vehicle-to-vehicle wireless communication protocols for enhancing highway traffic safety, IEEE Communications Magazine, 44(1):74-82, 2006.
J.J. Blum, A. Eskandarian, and L.J. Hoffman, Mobility management in ivc networks, In Proc. of Intelligent Vehicles Symp., pp. 150-155, 2003.
J.J. Blum, A. Eskandarian, and L.J. Hoffman, Challenges of intervehicle ad hoc networks, IEEE Transactions on Intelligent Transportation Systems, 5(4):347-351, 2004.
R. B. Marks, "The IEEE 802.16 Working Group on Broadband Wireless," IEEE 802 Perspectives, IEEE Network, pp. 4-7, Mar./Apr. 1999.
L.M. Feeney and M. Nilsson, Investigating the energy consumption of a wireless network interface in an ad hoc networking environment, In Proc. of INFOCOM, pp. 1548-1557, 2001.
J.R. Jiang, Y.C. Tseng, C.S. Hsu, and T.H. Lai, Quorum-based asynchronous power-saving protocols for ieee 802.11 ad hoc networks, Mobile Networks and Applications, 10(1-2):169-181, 2005.

(Continued)

*Primary Examiner* — Joseph Chang
*Assistant Examiner* — Jeffrey Shin
(74) *Attorney, Agent, or Firm* — Philip J. Feig

(57) ABSTRACT

An asymmetric and asynchronous energy conservation protocol for vehicular networks is provided. In one aspect, an a-quorum may be defined for one or more members for the one or more members to establish asymmetric links to contact the cluster head. An s-quorum for the cluster head to establish symmetric link between the cluster heads and relays may be defined.

30 Claims, 8 Drawing Sheets

OTHER PUBLICATIONS

C.R. Lin and. M. Gerla. Adaptive clustering for mobile wireless networks. IEEE Journal on Selected Areas in Communications, 15(7):1265-1275; 1997.

W.S. Luk and T.T. Wong, Two new quorum based algorithms for distributed mutual exclusion, In Proc. of ICDCS, pp. 100-106, 1997.

A.B. McDonald and T.F. Znati, Design and performance of a distributed dynamic clustering algorithm for ad-hoc networks, In Proc. of Annual Simulation Symp., pp. 27-35, 2001.

H.J. Reumerman, M. Roggero, and M. Ruffini, The application-based clustering concept and requirements for intervehicle networks, IEEE Communications Magazine, 43(4):108-113, 2005.

R.A. Santos, R.M. Edwards, and A. Edwards, Cluster-based location routing algorithm for inter-vehicle communication, In Proc. of Vehicular Technology Conf., pp. 914-918, 2004.

Y.C. Tseng, C.S. Hsu, and T.Y. Hsieh, Power-saving protocols for ieee 802.11-based multihop ad hoc networks, In Proc. of INFOCOM, pp. 200-209, 2002.

S.H. Wu, K.T. Chuang, C.M. Chen, and M.S. Chen, Toward the optimal itinerary-based knn query processing in mobile sensor networks, IEEE Transactions on Knowledge and Data Engineering, 20(12):1655-1668, 2008.

X. Yang, J. Liu, N.H. Viadya, and F. Zhao, A vehicle-to-vehicle communication protocol for cooperative collision warning, In Proc. of MobiQuitous, pp. 114-123, 2004.

R. Zheng, J.C. Hou, and L. Sha, Optimal block design for asynchronous wake-up schedules and its applications in multihop wireless networks, IEEE Transactions on Mobile Computing, 5(9):1228-1241, 2006.

J. Zhu and S. Roy, Mac for dedicated short range communications in intelligent transport system, IEEE Communications Magazine, 41(12):60-67, 2003.

W. Chen and S. Cai, Ad hoc peer-to-peer network architecture for vehicle safety communications, IEEE Communications Magazine, 43(4):100-107, 2005.

* cited by examiner

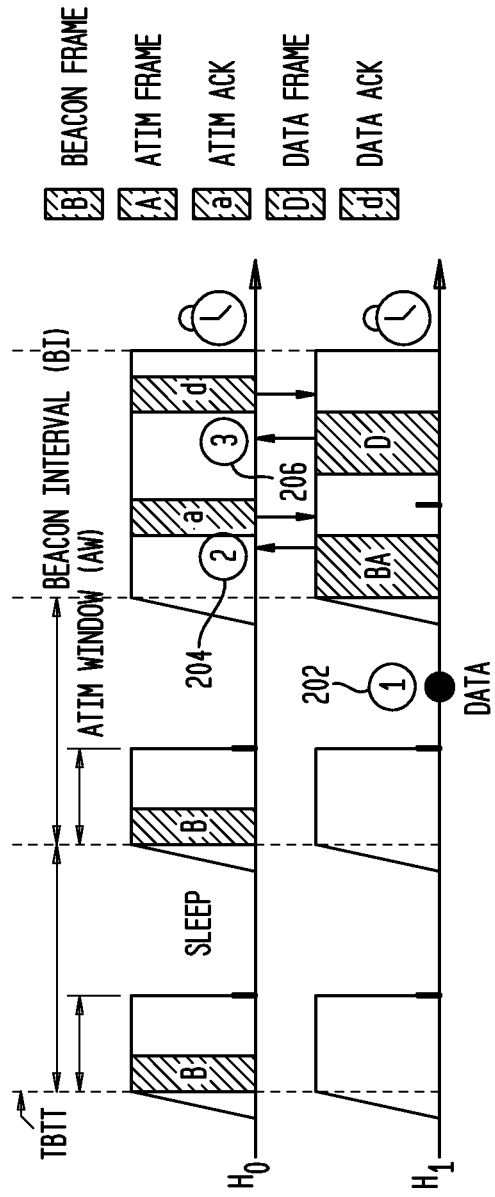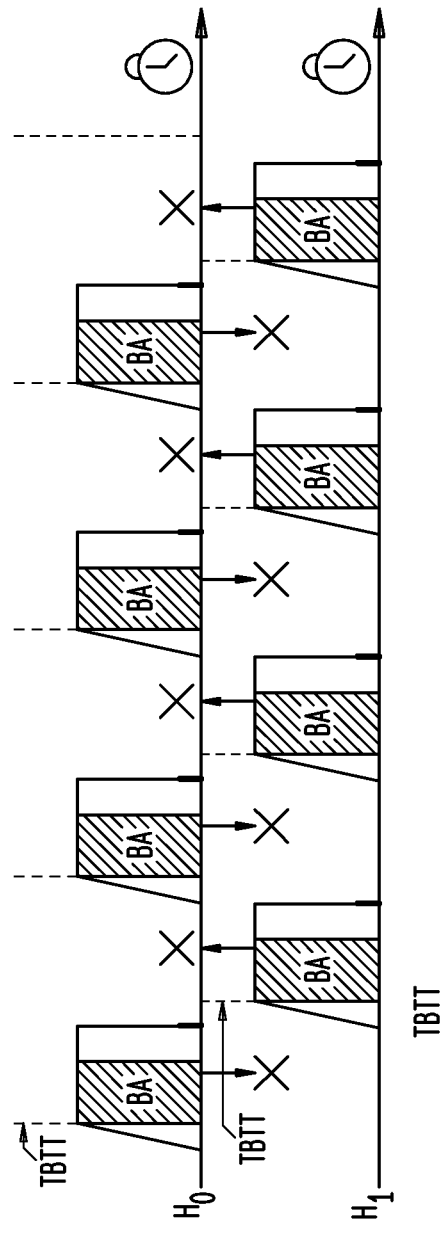

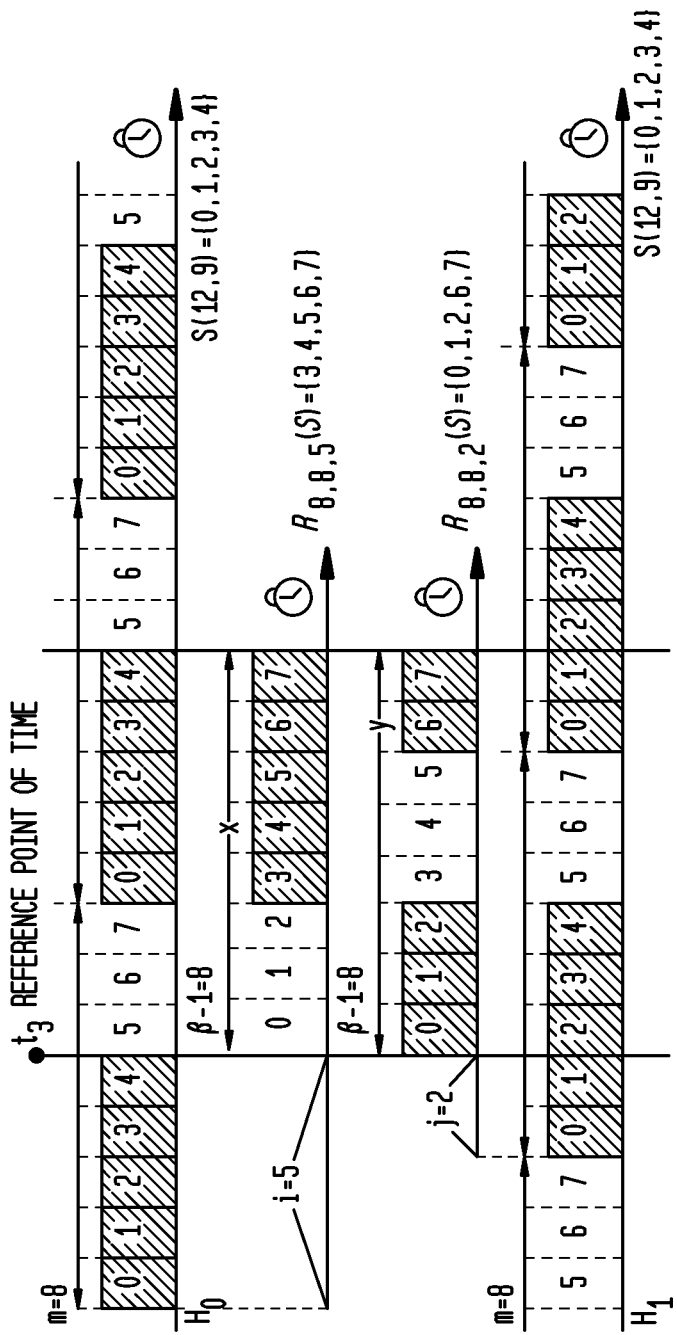

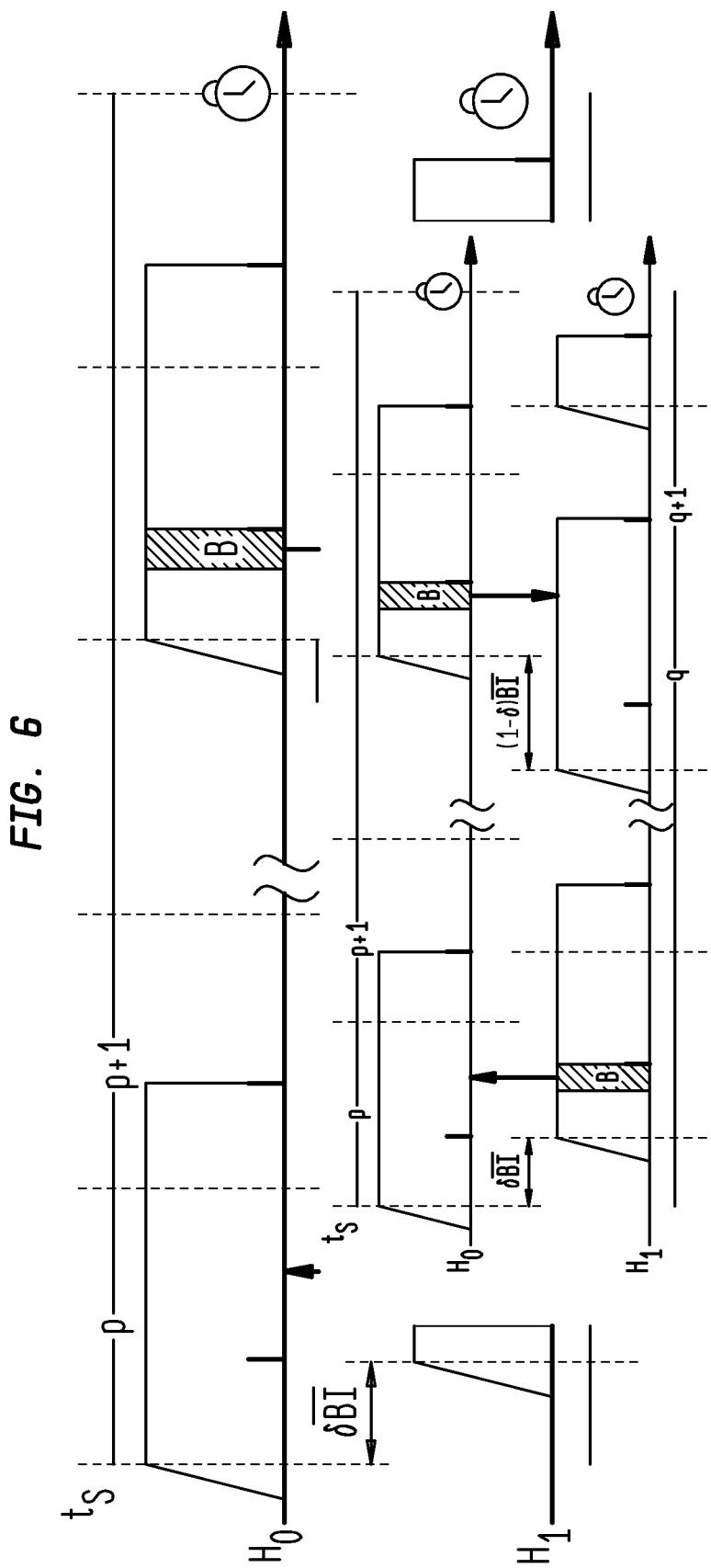

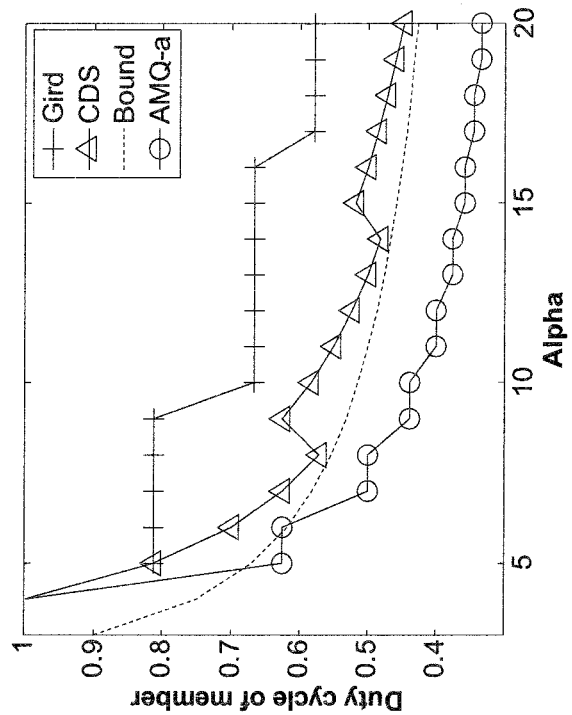
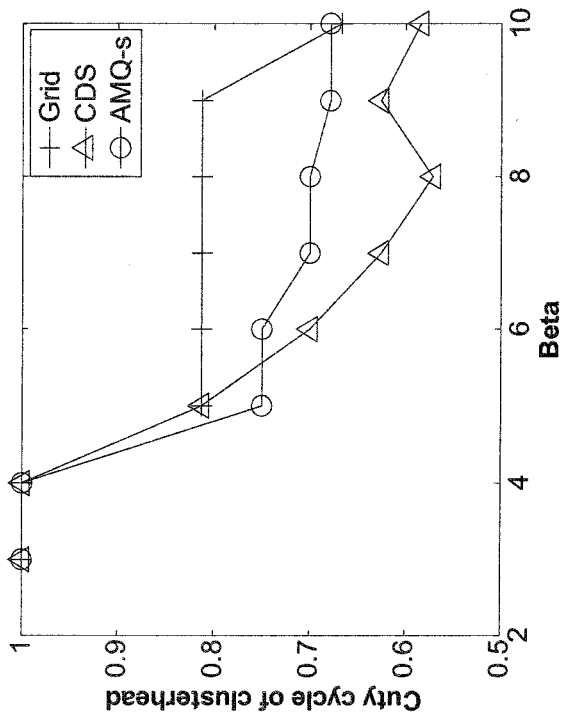
Fig. 7A
Fig. 7B

ASYMMETRIC AND ASYNCHRONOUS ENERGY CONSERVATION PROTOCOL FOR VEHICULAR NETWORKS

FIELD OF THE INVENTION

The present application relates generally to Dedicated Short Range Communications (DSRC), Intelligent Transportation Systems (ITS), vehicular network, wireless communication, energy conservation, quorum system, and more particularly to an asymmetric and asynchronous energy conservation protocol for vehicular networks.

BACKGROUND OF THE INVENTION

Intelligent transportation systems (ITS) encompass a broad range of wireless and wire line communications-based information and electronics technologies. Integrating ITS into the transportation system's infrastructure and in vehicles may improve safety on the roads, e.g., passenger and pedestrian safety, improve transportation productivity through the use of vehicle-to-vehicle and vehicle-to-roadside wireless communication technologies, and relieve congestion. For instance, investigations report that 17-37% of car accidents and 60% of roadway collisions could be prevented with development of the Intelligent Transportation Systems (ITS) technologies.

Due to the high mobility of vehicles, however, communications in vehicular networks need to satisfy strict delay requirements, which are usually less than a few hundreds of milliseconds. The United States Federal Communications Commission (US FCC) has approved 5.9 GHz spectrum for Dedicated Short Range Communications (DSRC) aiming to provide real-time, high speed links for vehicular networks. DSRC aims to support short duration wireless communications in rapid changing environments. Currently, the ASTM E2213-03 standard is being migrated to the IEEE 802.11p standard, and a new operation mode, named Wireless Access in Vehicular Environments (WAVE) mode, is added to IEEE 802.11.

ITS deployments require each vehicle to be equipped with an On Board Unit (OBU) performing wireless communications with the other vehicles or Road Side Units (RSUs). Briefly, equipment in the DSRC service comprises OBUs and RSUs. An OBU may be a transceiver that is installed in or on a vehicle, or a portable unit. An RSUs may be a transceiver that is mounted along a road or pedestrian passageway. An RSU may also be mounted on a vehicle or hand carried, but it may only operate when the vehicle or hand-carried unit is stationary. An RSU broadcasts data to OBUs or exchanges data with OBUs in its communications zone.

Certainly, the installation of OBUs on modern vehicles burdens the ever-increasing fuel consumption over the automotive electronic devices. Besides, the market has seen an increasing adoption of portable navigation devices (e.g., PDA) which may include OBU functions in the future. As significant gains in energy conservation are not likely to advent through refinement of the mature drivetrain (e.g., internal combustion engine) or battery technologies, there is a need for an energy-conservative communication protocol that improves the fuel/battery economy.

One direct way for DSRC to achieve fuel/energy conservation is to inherit the Power Saving (PS) mode from IEEE 802.11 standard. In IEEE 802.11 PS mode, the time axis on a station (in this case, OBU) is divided evenly into beacon intervals. Beacon interval in IEEE 802.11 refers to the amount of time between beacon transmissions. Before a station enters power save mode, the station uses the beacon interval to know when to wake up to receive the beacon. IEEE 802.11 PS mode allows an idle station to sleep a portion of each beacon interval. In IEEE 802.11 PS mode, an auxiliary timer synchronization mechanism is required to ensure the overlap of awake periods. Two power saving vehicles can communicate with each other only when their timers are synchronized. Since the topology of a vehicular network is frequently partitioned, making the timer synchronization costly or even infeasible, the IEEE 802.11 PS mode may not be practicable in vehicular networks.

Based on the IEEE 802.11 PS mode, a number of studies have explored Asynchronous Quorum-based Power Saving (AQPS) protocols. In an AQPS protocol, a station may stay awake or sleep during each beacon interval. Given an integer n, a quorum system defines a cycle pattern, which specifies the awake/sleep schedule during n continuous beacon intervals, for each station. Herein, n is referred to as the cycle length since cycle patterns repeat every n continuous beacon intervals. AQPS protocols ensure the asynchronous overlap of awake periods between stations; that is, during each cycle, an awake beacon interval of a station is guaranteed to overlap that of another station, and data communications can be successfully performed at these overlapped intervals, even if their boundaries are not aligned.

While AQPS protocols require no timer synchronization mechanism and may exhibit better feasibility for wide-scale, high-mobility vehicular networks, in most AQPS protocols the degree of power saving is limited by a theoretical bound. Given a cycle length n, a station is required to remain fully awake at least $\sqrt{n}$ beacon intervals per cycle to preserve the asynchronous overlap. The duty cycle of a station (i.e., portion of time a station must remain awake) can be no less than $O(\sqrt{n}/n)=O(1\sqrt{n})$. Note the neighbor discovery time increases proportionally to n due to the fact that the overlap may occur merely once every n beacon intervals. In presence of high mobility, the value of n should be set small to allow valid neighbor maintenance on each station. Under such a condition, the lower-bound of duty cycle can seriously restrict the effectiveness of an AQPS protocol.

It remains a challenge to efficiently assemble a symmetric quorum system while keeping the quorum size small. Existing symmetric quorum systems are constructed by using exhaustive searches or assuming $n=k^2+k+1$, where k is a prime power. To efficiently construct an asymmetric quorum system (i.e., a-quorums and s-quorums) is even more challenging.

BRIEF SUMMARY OF THE INVENTION

A method and system for an asymmetric and asynchronous energy conservation protocol for vehicular networks are provided. The method in one aspect may include defining an a-quorum for one or more members of a cluster, the cluster including a plurality of moving vehicles in a vehicular network and in which the plurality of moving vehicles are designated as a member, a cluster head) or a relay, the a-quorum specifying a beacon interval for one or more members of the cluster to establish asymmetric links to contact a cluster head of the cluster. The method may also include defining an s-quorum for the cluster head to establish symmetric link between the cluster head and one or more of other cluster heads in one or more other clusters.

A system for an asymmetric and asynchronous energy conservation protocol for vehicular networks, in one aspect, may include a plurality of stations associated with respective one or more vehicles in a vehicular network. The plurality of stations are organized into one or more clusters, and assigned as one of a member, cluster head, or relay in a respective cluster. An a-quorum specifies a beacon interval for one or more members of a cluster to establish asymmetric links to contact a cluster head of the cluster, and an s-quorum define a set of beacon intervals for the cluster head to establish symmetric link between the cluster head and one or more of other cluster heads in one or more other clusters.

A program storage device readable by a machine, tangibly embodying a program of instructions executable by the machine to perform the methods described herein may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 2A and 2B illustrate the operation of IEEE 802.11 Power Saving (PS) mode.

FIG. 4B illustrates that AMQ ensure that all projections of $S(\alpha, \beta)$ onto a modulo-$(\beta-1)$ plane forms an $(\beta-1)$-bicoterie.

FIG. 6 illustrates that DSRC-AA guarantees the worst case neighbor discovery time of symmetric and asymmetric links.

FIGS. 7A and 7B illustrates comparison of the duty cycles over specific requirements on neighbor discovery time.

DETAILED DESCRIPTION

This disclosure describes a new energy conservation protocol for DSRC, named DSRC Asymmetric and Asynchronous wakeup (DSRC-AA), which reduces duty cycles and improves energy efficiency as compared with traditional AQPS protocols while ensuring real-time link access. In one aspect, DSRC-AA is based on IEEE 802.11 and provides power saving to the communication module in vehicles (e.g., a built-in OBU or a portable device), while ensuring a bounded delay overhead.

The following notations are used in the disclosure:
Symbol Description
$\overline{BI}$ duration of a beacon interval
$\overline{AW}$ duration of an ATIM window
n the cycle length
δ time shift remainder (in each $\overline{BI}$)
U the universal set
Q a quorum
α tolerable neighbor discovery time (in number of $\overline{BI}$ s) for Vehicle-To-Vehicle (V2V) asymmetric links
β tolerable neighbor discovery time (in number of $\overline{BI}$ s) for Vehicle-To-Roadside (V2R) or V2V symmetric links
$A(\alpha)$ a generating set for a-quorums
$S(\alpha, \beta)$ a generating set for s-quorums There are two network scenarios described in DSRC: the distributed and centralized networks. The distributed network is formed by the On board Units (OBUs) that gives ad hoc connectivity between vehicles; while the centralized network is formed by the Road Side Units (RSUs) offering vehicles the wired backbone access.

Figure 1:
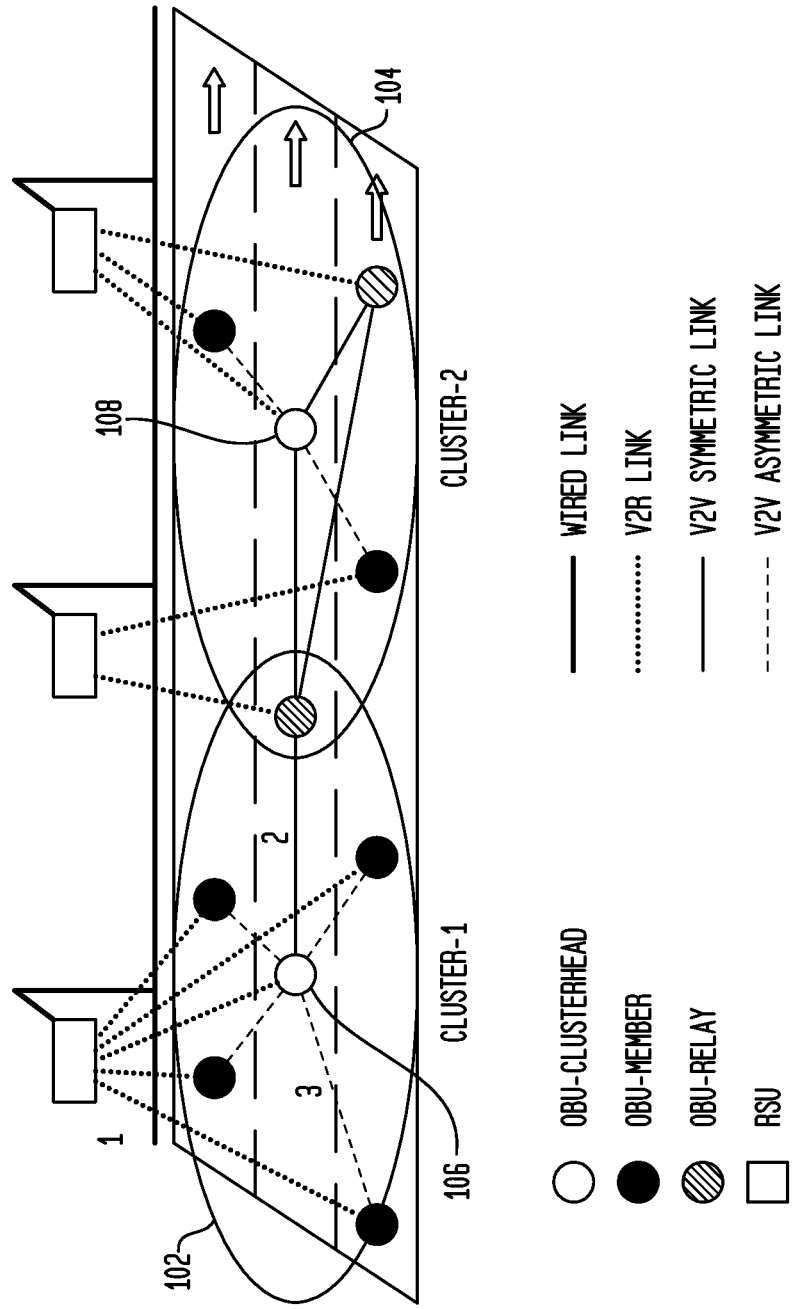
FIG. 1 illustrates symmetric/asymmetric links in clustered vehicular networks.

FIG. 1 illustrates symmetric and asymmetric links in clustered vehicular networks. In a driving scenario, vehicles moving in the same direction, for example, following the lane direction, have low relative speed. Due to their low relative mobility, vehicles moving toward the same direction may have connection periods longer than 10 seconds. The topology among these vehicles is stable. Those vehibles may be organized as a cluster.

FIG. 1 illustrates two clusters 102, 104 of vehicles moving in low relative speed to one another. In each cluster, a temporary clusterhead may be elected (e.g., 106, 108), which gathers information from nearby vehicles in the cluster and coordinates operations (e.g., collision avoidance, emergency warning, or highway platooning). In one aspect, each vehicle may have a functional role of clusterhead, relay, or member. The clusterhead normally serves as the local coordinator in a cluster that ensures consisten, reliable, and sequenced reactions to traffic changes. The relay forwards data within a cluster or between clusters. The member is an ordinary node that communicates only with the other vehicles in the same cluster. Compared to the flat structure, clustering allows efficient mobility management, locatlization of node dynamics, and better network scalability. Such a clustering or grouping concept allows the sequenced and consistent reactions to traffic changes while avoiding message flooding. DSRC provides vehicle-to-vehicle and/or vehicle-to-roadside links lasting 200 to 300 meters line of sigh typically.

In a cluster (e.g., 102, 104), each member (i.e., regular vehicle) may rely on the clusterhead to forward its awake/sleep schedule or data. There is no need to maintain the overlap of awake intervals between every pair of vehicles. In other words, it is sufficient to ensure that the awake periods of each member in a cluster will overlap with those of the clusterhead (e.g., 102, 104).

DSRC-AA in one embodiment employs a new type of quorum system, named Asymmetric Majority Quorum (AMQ) system, tailored for vehicular networks. The AMQ system defines two types of cycle patterns for members and the clusterhead respectively. These cycle patterns guarantee the overlap of awake beacon intervals between each member and the clusterhead in a cluster, and between all clusterheads in a network. The construction of cycle patterns for the member and clusterhead is based on the specific delay requirements α and β respectively, where α denotes maximum allowable latency in vehicle-to-vehicle communications and β denotes the allowable latency in vehicle-to-roadside communications. Since vehicles in the same cluster remain relatively stable in topology, it is assumed that $\alpha \geq \beta$, based on which the duty cycles of a member and its clusterhad may be differentiated. According to the system and method of the present disclosure in one embodiment, when a heavier duty cycle is taxed on the clusterhead to meet the strict β, each member in a cluster can have lighter duty cycle below the $O(1/\sqrt{n})$ bound, without losing the performance guarantee to α. Since members are the majority of vehicles, DSRC-AA enables substantial reduction in average energy consumption.

In one embodiment, DSPC-AA defines a-quorums and s-quorums for the members and clusterheads (or relays, RSUs) respecively. Quorums generally refer to sets in which a pair of quorums has some elements in common. In one embodiment, asymmetric links are established between members and their clusterhead. In this disclosure, members are also referred to as member nodes. Symmetric links are established between clusterheads and relays. Consider two positive integers α and β which may denote the maximally tolerable neighbor discover time (in terms of the number of beacon intervals) of the asymmetric and symmetric links respectively. The two parameters may set, for instance by a system administrator and received as input parameters.

We assume $\alpha \geq \beta$ since vehicles in the same cluster are relatively stable as compared with their absolute moving speed. Let $n=\lfloor(\alpha-1)/2\rfloor$ be the cycle length of members and $\{0, 1, \ldots, n-1\}$ be the set of numbers of beacon intervals in a cycle, the a-quorums, $A(\alpha)$, is defined as follows:

$$A(\alpha)=\{0\}. \quad (1)$$

This implies that each member should remain awake during the first beacon interval of a cycle. That is, during beacon intervals 0 to n−1, a station needs to stay awake only at the 0-th beacon interval.

Let $m=\lfloor(\alpha-1)/2\rfloor+\lfloor(\beta-1)/2\rfloor-1$ be the cycle length of the clusterheads (or relays, RSUs) and $\{0, 1, \ldots, m-1\}$ be the set of numbers of beacon intervals in a cycle, the s-quorums, $S(\alpha,\beta)$, is defined as follows:

$$S(\alpha,\beta)=\{0, 1, \ldots, \lfloor(\alpha-1)/2\rfloor-1\}. \quad (2)$$

That is, during beacon intervals 0 to m−1, a station needs to stay awake only at the 0-th, 1, . . . , floor((alpha-1)/2)−1 beacon intervals. Cycle length in the present disclosure refers to the number of beacon intervals for which the wake-up and sleep schedule repeats on a station.

In one embodiment, DSRC-AA inherits the beacon structure as given in IEEE 802.11 PS mode and in J. R. Jiang, Y. C. Tseng, C. S. Hsu, and T. H. Lai. Quorum-based asynchronous power-saving protocols for ieee 802.11 ad hoc networks. Mobile Networks and Applications, 10(1-2); 169-181, 2005. During the beacon intervals whose numbers are specified in the quorum, a station is required to remain fully awake. During the rest of beacon intervals, the station may sleep after the Ad hoc Traffic Indication Map (ATIM) window. Briefly, ATIM are used in IEEE 802.11 to announce the existence of buffered frames. These messages are sent between wireless stations to prevent them entering power saving mode and to indicate there is data to follow.

Given a-quorum or s-quorum, a station shall stay awake at those beacon intervals whose numbers are specified in the quorum. Since this quorum can overlap with another quorum or quorums (depending on its type "a" or "s"), the station can have a chance to discover and communicate with other stations at the overlapped beacon interval, therefore stay connected to the whole network. The overlap between quorums ensures network connectivity.

In clustered vehicular networks, the clusterheads, relays, and RSUs can use s-quorums to establish symmetric links (FIG. 1, 102, 104) between themselves; while members can use a-quorums to establish asymmetric links (FIG. 1, 106) to contact their clusterheads. Stations adopting s-quorums are able to discover each other as in conventional quorum systems. The asymmetric quorum system guarantees the intersection between every pair of s-quorums. Stations adopting a-quorums, however, can only discover stations with s-quorums. The asymmetric quorum system does not guarantee intersection between a-quorums. Once two stations both stay awake in a beacon interval, they can discover each other, i.e., to remember the schedule of each other, and predict when the next awake beacon interval should arrive at the receiving station if it want to send data. In this way, a "link" is considered established between these two nodes. In this disclosure, "a" is used to indicate that some link can be establed only between members and clusterheads, but not between members themselves.

Notice that in clustered vehicular networks, the majority of the vehicles are members. Since these members adopt a-quorums to contact their clusterheads, the small-sized a-quorums, as given in Eq. (1), can yield significant gain in energy saving.

Conventional AQPS protocols adopt symmetric quorum systems to define cycle patterns for all nodes in a network. The system and method of the present disclosure, on the other hand, differentiates the cycle patterns of members and clusterheads (or relays, RSUs) by using an asymmetric quorum system. The asymmetric quorum system defines a-quorums and s-quorums for the members and clusterheads (or relays, RSUs) respectively, and therefore the duty cycles of members and clusterheads (or relays, RSUs) are differentiable without losing the network connectivity. Eq. (1) above shows that the cardinality of an a-quorum can be arbitrarily small (specifically, O(1)-sized). Therefore, the degree of power saving is expected to be substantially improved.

The design of DSRC-AA takes into account several practical issues. Although there may not be an intersection between those stations that adopt a-quorums, that does not imply that members are not able to directly communicate with each other. For instance, although stations can adopt the same a-quorum, their clock may shift. For example, beacon interval 0 on station X may be beacon interval 3 on station Y when station Y's clock is two-interval-faster than X. Under such a situation, the two a-quorums do not intersect either from X's or Y's point of view. Rather, a clusterhead knows the schedule of each member in a cluster through asymmetric links, and therefore, for example, can piggyback the member's schedule in its own beacon frames. By listening to the beacon frames of the clusterhead carrying all members' schedules, members are able to obtain one another's schedule and predict the coming ATIM window at the receiving party. Further, under the situation that a cluster is forming or reforming, or the clusterhead is lost, members can temporarily adopt s-quorums until a clusterhead is elected. For example, if a member does not receive the beacon frame of its clusterhead for a long time (longer than a threshold), it then may adopt the s-quorum directly; that is, stay awake for those beacon intervals whose numbers are specified in the s-quorum.

In one embodiment of the present disclosure, to resolve the possible fairness issue on fuel/energy consumption if the asymmetric quorum system poses heavier duty cycles on vehicles using s-quorums, the system and method of the present disclosure may allow the clusterhead to either specify a successor or trigger a re-election after its serving age.

With the beacon structures using the symmetric and asymmetric quorum system of the present disclosure, two stations $H_0$ and $H_1$ adopting $S(\alpha,\beta)$ and $S(\alpha',\beta)$, $\alpha, \alpha' \geq \beta$, as quorums respectively are able to discover each other within β beacon intervals despite their clock shifts. For instance, alpha (α) and alpha prime (α') may represent two different "tolerance" parameters. Even if two stations adopts quorums constructed base on different alpha values, they are still guaranteed to both remain awake at some beacon interval, despite of their clock shift. Also, two stations $H_0$ and $H_1$ adopting $A(\alpha)$ and $S(\alpha',\beta)$, $\beta \leq \alpha \leq \alpha'$, as quorums respectively are able to discover each other within a beacon intervals despite their clock shifts. Thus the connectivity of a network may be ensured. Further, since in DSRC-AA a station remains awake during every ATIM window, the data buffering delay is bounded by a beacon interval. DSRC-AA renders great feasibility for vehicular networks since it improves the overall energy efficiency while ensuring a bounded neighbor time and data buffering delay.

The following briefly describes IEEE 802.11 PS mode.

The operation of IEEE 802.11 Power Saving (PS) mode is shown in FIG. 2A. On each PS station, the time axis is divided evenly into beacon intervals. In every beacon interval, the station is required to remain awake during the entire Announcement Traffic Indication Message (ATIM) window. A beacon frame is broadcasted at the Target Beacon Transmission Time (TBTT) to announce the existence of network. If a station, e.g., H1, intends to transmit data to the destination H0 (FIG. 2A, shown at 202), H1 first unicasts an ATIM frame to H0 during the ATIM window (FIG. 2A, shown at 204). Remaining awake, H0 receives the ATIM frame and sends back an acknowledgement. Both H0 and H1, after this ATIM notification procedure, keep awake for the entire beacon interval. After the end of ATIM window, the DCF (Distributed Coordination Function) mechanism (e.g., RTS, CTS, and random back-off) are initiated to transmit the data while avoiding collisions (FIG. 2A shown at 206). If there are no ATIM notifications, PS stations may enter the doze mode (that is, to sleep) after each ATIM window. Since $\overline{AW}$ (i.e., duration of an ATIM window) is one fourth of $\overline{BI}$ (i.e., duration of a beacon interval), this protocol is able to yield up to 75% energy saving on idle stations.

However, the IEEE 802.11 PS mode is functional only when the timers on stations are synchronized FIG. 2B shows an example where the ATEM frames of H0 and H1 are lost due to their unsynchronized clocks. Apparently, communications between stations can take place only after timer synchronization. In vehicular networks, synchronizing the clocks between OBUs through infrastructures may get costly since the connection period of vehicle-to-roadside links is usually short. Synchronizing through vehicle-to-vehicle links may not be feasible because the distributed network is subject to frequent partition. Stations operating in the WAVE mode are not required to synchronize their timers. This raises a need for an asynchronous energy conservation protocol.

The following describes the AQPS Protocols.

Figure 3:
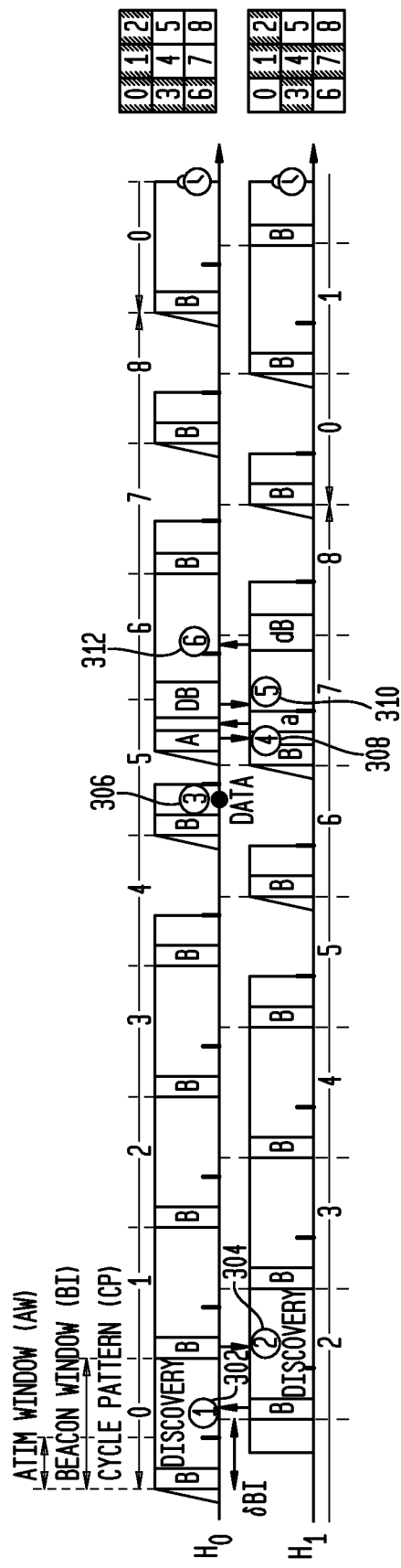
FIG. 3 illustrates two awake/sleep schedules given by a grid quorum scheme.

The Asynchronous Quorum-based Power Saving (AQPS) protocols ensure the overlap of awake periods between stations by using the quorum systems (e.g., grid, torus, and cyclic difference set). The grid/torus-based AQPS protocols are summarized as follows. FIG. 3 illustrates two awake/sleep schedules given by a grid quorum scheme with cycle length n=9. A grid quorum scheme numbers every n continuous beacon intervals from 0 to n−1 and organizes them as an √n×√n array in a row-major manner. It defines a quorum as a set containing all numbers along a column and a number from each of the remaining columns (e.g., {0.1, 2, 3, 6} or {2, 3, 4, 5, 8} as shaded in FIG. 3). Each station, by using this scheme, is able to obtain its own quorum with a uniform quorum size (i.e., the cardinality of quorum set) 2√n−1. During the beacon intervals whose numbers are specified in the quorum, a station is required to remain fully awake. During the rest of beacon intervals, the station may sleep after the ATIM window as in the IEEE PS mode if there is no data transmission. Since the schedule repeats every n beacon intervals, we call it cycle pattern (or cycle for short). A station with this scheme may have duty cycle $$\frac{(2\sqrt{n} - 1)\overline{BI} + (n-2)\sqrt{n} + 1)\overline{AW}}{n\overline{BI}}.$$

In AQPS protocols, a beacon frame carries information about the schedule (e.g., the quorum set and number of current beacon interval, etc.). Unlike IEEE 802.11 PS mode where a station should cancel its own beacon transmission upon hearing the first beacon frame, each station persists its beacon transmission (even when others' beacons are heard) in order to claim its own schedule.

Each quorum in the gird/torus quorum scheme intersects with any other quorum in at least two elements. This implies that the ATIM windows between stations can overlap at least twice per cycle, if there is no clock shift. The grid/torus quorum scheme is able to further guarantee that the beacon frame of a station will be heard by its neighbors within a cycle even when their clocks shift. FIG. 3 shows an example where H1'S clock leads H0's by 2−δ beacon intervals. The mutual beacon reception is marked by FIG. 3 at 302 and 304. Once the beacon frame is heard, the sending station is able to discover the receiving station (that is, to recognize the schedule of receiving station) and predict its next coming of ATIM window.

Suppose H0 has data for H1 (FIG. 3 at 306), it waits until H1 wakes up and unicasts an ATIM frame to H1 to start the data transmission procedure described previously in the IEEE 802.11 PS mode (FIG. 3 at 308). If data transmission cannot complete within a single beacon interval (e.g., due to collisions or large data volume), H0 can set the has-more-data field in frame header true telling H1 to remain awake during the entire successive beacon interval (FIG. 3 at 110). Data transmission may continue then (FIG. 3 at 112).

The power saving advantage provided by the IEEE PS mode and AQPS protocols comes at the price of delay. Such delay includes the data buffering time, i.e., duration between a packet arrival (on a sending station) and its start of DCF. The data buffering time in IEEE PS mode and AQPS protocols is bounded within a $\overline{BI}$, which equals 100 ms by default. Note in AQPS protocols, two adjacent stations may not be able to discover each other until a cycle goes by. The neighbor discovery time, i.e., the time for a station to discover its new neighbor, is therefore O(n$\overline{BI}$) in the worst case. This implies that the value of n should be small in vehicular networks to ensure the valid neighbor maintenance. For example, consider a vehicle moving in speed 20 m/s toward a tolling RSU with radio range 15 meters. If half of the connection period is used for tolling, the RSU must discover the vehicle's OBU within $$\left[\frac{1}{2} \cdot \frac{2 \cdot 15}{20}\right] = 0.7$$

seconds. The value of n can be no larger than $$\frac{0.7 \cdot 1000}{\overline{BI}} = 7(\overline{BI} = 100 \text{ ms}).$$

In this case, only the √4×√4 array is applicable to the grid quorum scheme, giving the duty cycle $$\frac{(2\sqrt{4} - 1) \cdot 100 + (4 - 2\sqrt{4} + 1) \cdot 24}{4 \cdot 100} = 0.81(\overline{AW} = 25 \text{ ms})$$

and 19% power saving on an idle station. Most existing AQPS protocols have limited effect when n is small since their resulted duty cycle can be no less than O(√n/n)=O(1/√n).

Details of the quorums and protocols of the present disclosure described above are provided as follows. As described above, the DSRC-AA of the present disclosure employs a new quorum system, named asymmetric quorum system, to ensure the overlap of awake periods. The asymmetric quorum system defines two types of quorums: the s-quorums (symmetric quorums) and a-quorums (asymmetric quorums). In clustered vehicular networks, the clusterheads, relays, and RSUs can use s-quorums to establish symmetric links between themselves; while members can use a-quorums to establish asymmetric links to contact their clusterheads. Stations adopting s-quorums are able to discover each other as in conventional quorum systems. The asymmetric quorum system guarantees the intersection between every pair of s-quorums. In one embodiment, stations adopting a-quorums, however, can only discover stations with s-quorums. The asymmetric quorum system does not guarantee intersection between a-quorums. In the methodology of the present disclosure, the cardinality of an a-quorum can be arbitrarily small (specifically, (1)-sized). Therefore, the degree of power saving is expected to be substantially improved.

The following provides formal definitions of an asymmetric quorum system.

Asymmetric Quorum System

Consider the sets in which each element denotes a number of beacon interval.

Definition 3.1 (n □-coterie): Given an integer □ n and a universal set □U={0 □1 □n □−1}. Let X be a set of nonempty subsets of U. We call X an n-coterie if and only if for all $$Q, Q' \in X, \square Q \cap Q' \neq \emptyset.$$

Conventionally, the coterie X □ is termed quorum system, and the elements of X (i.e., Q) are called quorums. Stations adopting the quorums of an n-coterie are able to discover each other once every n beacon intervals, implying the worst-case neighbor discovery time $O(n\overline{BI})$. In presence of clock shift between stations, an n-coterie can still guarantee the $O(n\overline{BI})$ worst-case neighbor discovery time if it is cycle. The above definition serves as the basis for most quorum schemes used in existing AQPS protocols. For example, the set {{0 □1 □2 □3 □6}, {1 □2 □3 □4 □7}} shown in FIG. 3 is a 9-coterie. These quorum schemes are to as symmetric in the sense that they ensure the intersection between every pair of quorums.

In the present disclosure, we generalize the definition of a coterie to define an asymmetric quorum system.

Definition 3.2 (n-bicoterie): Given an integer n and a universal set U={0, 1, . . . , n−1}. Let X and Y be two sets of nonempty subsets of U respectively. The pair (X,Y) is called an n-bicoterie if and only if for all Q∈X and Q'∈Y, Q∩Q'≠∅.

Note (X, X) is a bicoterie if and only if □ is a coterie.

Definition 3.3 (n-asymmetric quorum system): Given an integer n and a universal set U={0, 1 . . . , n−1}. Let X and Y be two sets of nonempty subsets of U. The ordered pair (X,Y) is called an n-asymmetric quorum system if and only if (a) (X,Y) is an n-bicoterie; (b) Y is an n-coterie.

The elements of X and Y are called the a-quorums and s-quorums respectively. The asymmetric quorum system defined above is similar to the read-write quorum systems used in replication management. Different from traditional (i.e., coterie-based) quorum systems, an asymmetric quorum system does not guarantee intersection between a-quorums. In an asymmetric quorum system, given the same cycle length n, the size of a-quorums can be substantially smaller than that of traditional quorums. The a-quorum size is not lower bounded by $O(\sqrt{n})$ as in traditional quorum systems. When a-quorums are applied to the members of a cluster, each member may have a duty cycle below $O(\sqrt{n}/n)=O(1/\sqrt{n})$, yielding significant gain in energy saving. Note that in such a case, the worst case data buffering time and neighbor discovery time remain unchanged ($\overline{BI}$ and n $\overline{BI}$ respectively). The reduction in members' duty cycle does not induce any cost over the worst case delay.

Recall that vehicles in the same cluster are relatively stable in topology as compared with their absolute moving speeds. The maximum allowable neighbor discovery time need not be identical between vehicle-to-vehicle and vehicle-to-roadside communications. To reflect this fact, we may further generalize the definition of an asymmetric quorum system.

Defintion 3.4 (c-truncation): Given an integer c and a set Q. We call $T_c(Q)$ a c-truncation of Q if and only if $T_c(Q)=\{q: 0 \leq q \leq c-1, q \in Q\}$.

Let X be a set of nonempty subsets of U, U={0, 1, . . . , n−1}. For convenience, we denote $T_m(X)=\{T_m(Q): \forall Q \in X\}$.

Definition 3.5 ($(n_a, n_s)$-asymmetric quorum system): Given two integers $n_a$ and $n_s$. Let X and Y be sets of nonempty subsets of $U_x$ and $U_y$ respectively, where $U_x=\{0, 1, \ldots, n_x\}$ and $U_y=\{0, 1, \ldots, n_y\}$, $n_x, n_y \in Z$. The ordered pair (X, Y) is called an $(n_a, n_s)$-asymmetric quorum system if and only if (a) $T n_a (X), T n_a (Y))$ is an $n_a$-bicoterie; (b) $T n_s (Y)$ is an $n_s$-coterie.

An $(n_a, n_s)$-asymmetric quorum system guarantees the worst case neighbor discovery time $n_a \overline{BI}$ and $n_s \overline{BI}$ for the asymmetric and symmetric links respectively. When $n_a=n_s=n_x=n_y=n$, an $(n_a, n_s)$-asymmetric quorum system degenerates into an n-asymmetric quorum system. Note an asymmetric quorum system applicable to AQPS protocols ensures the intersection when clocks shift between stations.

Existing quorum schemes find an optimal coterie by either using exhaustive searches or assuming n=k2+k+1, where k is a prime power. Observe that in clustered vehicular networks, the majority of the vehicles are members. Since these members adopt a-quorums to contact their clusterheads, any reduction in the size of a-quorums can yield significant gain in overall energy saving. We may alternatively find an asymmetric quorum system that ensures the minimum a-quorum size.

The Majority-Based Constructing Scheme

This section presents a constructing scheme for the asymmetric quorum system, named Asymmetric Majority Quorum (AMQ) scheme, that has O(1) running-time complexity and gives the minimum (i.e., O(1)-sized) a-quorums. Different from most existing quorum schemes which take the cycle length n as the input, the AMQ scheme takes the delay requirements of vehicles as the input. The produced a-quorums and s-quorums can therefore ensure real-time neighbor discovery and transmissions between all stations (including clusterheads, relays, members, and RSUs). This scheme is tailored for environments with strict delay requirements.

Given two positive integers a and p which denote the maximally tolerable neighbor discover time (in terms of the number of beacon intervals) for the asymmetric and symmetric links respectively. We assume $\alpha \geq \beta$ since vehicles in the same cluster are relatively stable as compared with their absolute moving speed. Let $n=\lfloor(\alpha-1)/2\rfloor$ be the cycle length of members and U={0, 1, . . . , n−1} be a universal set, the set of numbers of beacon intervals in a cycle, we define a generating set of a-quorums over U as $$A(\alpha)=\{0\}. \quad (1)$$

Let $m=\lfloor(\alpha-1)/2\rfloor+\lfloor(\beta-1)/2\rfloor-1$ be the cycle length of the clusterheads (or relays, RSUs) and U'={0, 1 . . . , m−1} be a universal set, the set of numbers of beacon intervals in a cycle, we define a generating set of s-quorums over U', $S(\alpha, \beta)$, as $$S(\alpha,\beta)=\{0, 1, \ldots, \lfloor(\alpha-1)/2\rfloor-1\}. \quad (2)$$

For example, suppose $\alpha=12$ and $\beta=9$. We have A(12)={0} over U={0, 1, . . . , 4} and S(12, 9)={0, 1, . . . , 4} over U'={0, 1, . . . , 7}. Note the cardinality of A(α) equals 1 and is independent of α and β. In the present disclosure, we consider nontrivial parameters α, β≧5.

In the following description, we show how the AMQ scheme, i.e., Eqs. (1) and (2), can be applied to DSRC-AA to provide both the power saving and performance guarantee to vehicular networks.

The DSRC-AA Protocol

This description introduces the DSRC Asymmetric and Asynchronous wakeup (DSRC-AA) protocol. We show that DSRC-AA is able to achieve significantly better energy conservation than traditional AQPS protocols. In addition, the delay incurred by DSRC-AA is bounded by the delay requirements α and β.

Protocol Design

In one embodiment, DSRC-AA inherits the beacon structure of traditional AQPS protocols described above. However, different from most AQPS protocols, DSRC-AA allows different cycle patterns to be formed on different stations. Specifically, we let the members of a cluster form their cycle patterns based on the generating set of a-quorums A(α), and let the clusterheads, relays, and RSUs form their cycle patterns based on the generating set of s-quorums S(α,β). During the beacon intervals whose numbers are specified in A(α) or S(α,β), a station is required to remain fully awake. During the rest of beacon intervals, the station may sleep after the ATIM window as in the IEEE PS mode if there is no data transmission. This process repeats so the cycle lengths on a member and a clusterhead (or relay, RSU) are n and m respectively, where $n=\lceil(\alpha-1)/2\rceil$ and $m=\lceil(\alpha-1)/2\rceil+\lceil(\beta-1)/2\rceil-1$.

Each member has the duty cycle $$\frac{\overline{BI} + (n-1)\overline{AW}}{n\overline{BI}} \quad (3)$$

and each clusterhead (or relay, RSLD has the duty cycle $$\frac{\lceil(\alpha-1)/2\rceil\overline{BI} + (m-\lceil(\alpha-1)/2\rceil)\overline{AW}}{m\overline{BI}} \quad (4)$$

Each station broadcasts its beacon frames carrying the information about the awake/sleep schedule (e.g., α, β, and number of the current beacon interval, etc.) during the ATTM windows. Once two nearby stations hear mutual beacon frames, each of them can predict one another's ATIM window and then start the ATIM notification procedure to transmit data. The data buffering time in DSRC-AA may be no more than a $\overline{BI}$ (100 ms by default). Next, we show that DSRC-AA using A(α) and S(α,β)guarantees the worst case neighbor discovery time α $\overline{BI}$ and β $\overline{BI}$ for the asymmetric and symmetric links respectively. We define a useful notation:

Definition 4.1 ((n, n', l)-revolving set): Given integers n, n', and l, where 0≦l≦n-1. Let U={0, 1, . . . , n-1} be a universal set and Q be a subset of U. We define an (n, n', l)-revolving set of Q as $R_{n,n',l}(Q)=\{(q+\text{in})-1:0\leq(q+\text{in})-1\leq n'-1, \forall q\in Q, i\in Z\}$.

Intuitively, a revolving set is a projection of Q from the modulo-n onto the modulo-n' plane with an index shift l. For example, consider A(12)={0} and S(12, 9)={0, . . . , 4} shown above, which are subsets of U={0, 1, . . . , 4} and U'={0, 1, . . . , 7} respectively. Given two shift indices l=1 and l'=2, we may project these two sets from the modulo-5 and -8 planes onto the same modulo-11 plane by using $R_{5,11,1}(A(12))=\{4, 9\}$ and $R_{8,11,2}(A(12,9))=\{0, 1, 2, 6, 7, 8, 9, 10\}$ respectively, as we can see in FIG. 4A. Note both $R_{5,11,1}(A(12))$ and $R_{8,11,2}(A((12, 9))$ are subsets of a new universal set U"={0, 1, . . . , 10}. For convenience, we denote all possible projections of Q from the modulo-n onto the modulo-n' plane by $R_{n,n'}=\{R_{n,n',l}(Q):\forall l\in U\}$.

Lemma 4.1: Given α and β, α≧β, the pair $(R_{n,\alpha-1}(A(\alpha)), R_{m,\alpha-1}(S(\alpha,\beta)))$ forms an (α-1)-bicoterie.

Figure 4A:
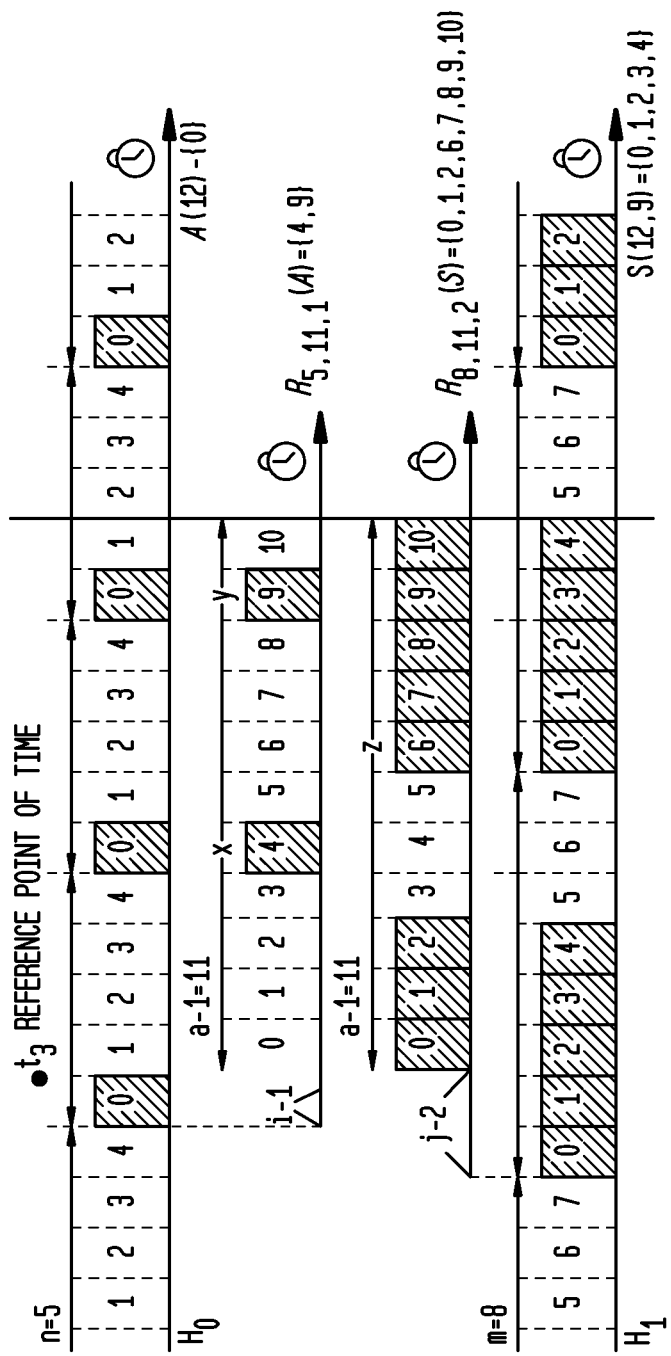
FIG. 4A illustrates that Asynchronous Majority Quorum (AMQ) of the present disclosure in one embodiment ensures that all projections of $A(\alpha)$ and $S(\alpha, \beta)$ onto a modulo-$(\alpha-1)$ plane forms an $(\alpha-1)$-bicoterie.

Proof: For brief, let A and S denote A(α) and S(α,β) respectively. We show that for all i and j, 0≦i≦n-1 and 0≦j≦m-1, $R_{n,\alpha-1,i,j}(S)\neq\forall$. By definition of A, any two elements in $R_{n,\alpha-1,i,j}(A)$ must have distance $\lfloor(\alpha-1)/2\rfloor$. Similarly, any two elements in $R_{m,\alpha-1,j}(S)$ must have distance either 1 or $\lfloor(\beta-1)/2\rfloor$. We can see that both $R_{n,\alpha-1,i}(A)$ and $R_{m,\alpha-1,j}(S)$ are not empty. Specifically, since $\alpha\geq 2\lfloor(\alpha-1)/2\rfloor$, there exist at least two elements in $R_{n,\alpha-1,i}(A)$. Let x and y be the first and second elements of $R_{n,\alpha-1,i}(A)$, as shown in FIG. 4A. We have $0\leq x\leq\lfloor(\alpha-1)/2\rfloor-1$ and $$y=x+\lfloor(\alpha-1)/2\rfloor\leq\alpha-2. \quad (5)$$

If x is included in $R_{m,\alpha-1,j}(S)$, we finish the proof. Otherwise, we show that y must be included in $R_{m,\alpha-1,j}(S)$. Consider the smallest element z (FIG. 4A) in $R_{m,\alpha-1,j}(S)$ which is larger than x. We have $$x+1\leq z\leq x+\lfloor(\beta-1)/2\rfloor-1 \quad (6)$$

because any two elements in $R_{m,\alpha-1,j}(S)$ must have their distance less than or equal to $\lfloor(\beta-1)/2\rfloor$. By definition of S, there exists $\lfloor(\alpha-1)/2\rfloor$ continuous (and ascending) elements starting from z in $R_{m,\alpha-1,j}(S)$. Since β≦α, by comparing Eqs. (5) and (6) we have $z<y\leq\min\{z+\lfloor(\alpha-1)/2\rfloor-1, \alpha-2\}$, implying that y is contained in $R_{m,\alpha-1,j}(S)$.

Following the previous example, we have α=12 and β=9. Suppose two stations $H_0$ and $H_1$ respectively adopt A(12) and S(12, 9) to folio their cycle patterns, as shown in FIG. 4A. The above lemma shows that, given any reference point of time t where $H_0$ and $H_1$ are in their $i^{th}$ and $j^{th}$ beacon intervals, these two stations are guaranteed to overlap in at least one awake beacon interval within α-1=11 beacon intervals after t, provided that their TBTT is aligned.

Lemma 4.2: Given α and β, α≧β, the set $R_{m,\beta-1}(S(\alpha,\beta))$ forms a (β-1)-coterie.

Proof: Let S denotes S(α,β). We show that for all i and j, 0≦i,j≦m-1, $R_m,\beta_{-1,i}(S)\cap R_m,\beta_{-1,j}(S')\neq\cup$. If both $R_m,\beta_{-1,i}(S)$ and $R_m,\beta_{-1,j}(S)$ contain the element 0, we finish the proof. Otherwise, without loss of generality let x, x≠0, be the smallest element of $R_m,\beta_{-1,i}(S)$, as illustrated in FIG. 4B. By definition of S, any two elements in $R_m,\beta_{-1,i}(S)$ must have distance less than $\lfloor(\beta-1)/2\rfloor$. We have $0<x\leq\lfloor(\beta-1)/2\rfloor-1$. If x is included in $R_m,\beta_{-1,j}(S)$, we finish the proof. Otherwise, consider the smallest element y in $R_m,\beta_{-1,j}(S)$ which is larger than x (FIG. 4B). Again, by definition of S we have $x+1\leq y\leq x+\lfloor(\beta-1)/2\rfloor-1$. Note that in $R_m,\beta_{-1,i}(S)$, there exist $\lfloor(\alpha-1)/2\rfloor$ continuous elements starting form x. Since α≧β and $\lfloor(\alpha-1)/2\rfloor\geq\lfloor(\beta-1)/2\rfloor$, y must be included in $R_m,\beta_{-1,i}(S)$.

Again, follow the example α=12 and β=9. Two stations $H_0$ and $H_1$ adopting S(12, 9) to form their cycle patterns are guaranteed to discover each other within β-1=8 beacon intervals after any reference point of time, if their TBTT is aligned. Note Lemma 4.2 can be proved by observing that both the cardinalities of $R_m,\beta_{-1,i}(S)$ and $R_m,\beta_{-1,j}(S)$ exceed (β-1)/2. That is, the elements in $R_m,\beta_{-1,i}(S)$ and $R_m,\beta_{-1,j}(S)$ are the majorities of the values $\{0, 1, \ldots, \beta-2\}$. By the pigeon hole principle, we conclude that $R_{m,\beta-1,i}(S)$ and $R_{m,\beta-1,j}(S)$ must intersect.

Theorem 4.1: Given $\alpha$ and $\beta$, $\alpha \geq \beta$, the ordered pair $(R_{n\infty}(A(\alpha)), R_{m,\infty}(S(\alpha,\beta)))$ forms an $(\alpha-1, \beta-1)$-asymmetric quorum system.

Proof: By Definitions 3.4 and 4.1, we can see that $T_{\alpha-1}$, $(R_{n\infty}(A(\alpha)))=(R_{n,\alpha-1}(A(\alpha))$ and $T_{\beta-1}(R_{n\infty}(S(\alpha,\beta)))=R_{m,\beta-1}(S(\alpha,\beta))$. This theorem is a direct consequence from Lemmas 4.1 and 4.2.

The above theorem implies that, in synchronous environments where there is no clock shift between stations or the clock shifts are multiples of a $\overline{BI}$, DSRC-AA guarantees the worst case neighbor discovery time to be less than $(\alpha-1)$ $\overline{BI}$, and $(\beta-1)$ $\overline{BI}$, for asymmetric and symmetric links respectively. It can be also shown that the neighbor discovery time in asynchronous environments (that is, environments where TBTT are not aligned between stations) is at most one $\overline{BI}$, more than that in synchronous environments. As a consequence, the performance requirements $\alpha$ and $\beta$ can be satisfied in all conditions.

The power saving performance of DSRC-AA when applied to the real-world scenarios in vehicular networks is now described. Follow the example described above where a tolling RSU (with radio range 15 meters) must discover vehicles (with absolute moving speed up to 20 m/s) within 0.7 second. We have $\beta=7$. It is shown that vehicles should ideally receive warning messages 120 meter ahead from an accident spot to avoid collisions. Suppose the relative moving speeds of vehicles are up to 20 m/s, the transmission radius of an OBU is 200 meters, and half of the connection period is used to send the warning message. A vehicle must be able to discover its new neighbor within $$\left\lfloor \frac{1}{2} \cdot \frac{200-120}{20} \right\rfloor = 2$$

seconds. We have $\alpha=20$. When the grid/torus quorum scheme is used, the grid size has to be smaller than $\min\{\alpha, \beta\}=7$, implying a $\sqrt{4} \times \sqrt{4}$ grid, to ensure valid neighbor discovery time between all stations. This results in a high duty cycle $$\frac{(2\sqrt{4}-1) \cdot 100 + (4-2\sqrt{4}+1) \cdot 25}{4 \cdot 100} = 0.81 \ (\overline{AW} = 25 \text{ ms})$$

and merely 19% power saving on an idle station. On the other hand, when the AMQ is applied, we have $A(20)=\{0\}$ over $U=\{0, 1, \ldots, 8\}$ and $S(20, 7)=\{0, 1, \ldots, 8\}$ over $U'=\{0, 1, \ldots, 10\}$ based on Eqs. (1) and (2) respectively. By Eq. (4), the duty cycle of clusterheads, relays, and RSUs is $$\frac{9 \cdot 100 + (11-9) \cdot 25}{11 \cdot 100} = 0.86,$$

yielding energy saving up to 14%. The power saving effect may be limited on these nodes as in traditional grid/torus quorum scheme. However, members adopting A(20) may have the duty cycle $$\frac{1 \cdot 100 + (9-1) \cdot 25}{9 \cdot 100} = 0.33$$

by Eq. (3). This gives energy saving up to 67%, which is more than a triple of that (19%) given by the grid/torus quorum scheme. DSRC-AA takes advantages of the asymmetric nature of delay requirements in vehicular networks to improve the power saving effect on the members.

Actually, the quorum size of $A(\alpha)$ is optimal given the delay requirement $\alpha$. If a traditional symmetric quorum system is used by a member, the cycle length must be less than or equal to $\alpha$, and the resultant duty cycle can be no less than $O(\sqrt{\alpha}/\alpha)=O(1/\sqrt{\alpha})$. If AMQ is used, by Eq. (1), we can see that the member adopting $A(\alpha)$ must remain awake one every $n=[(\alpha-1)/2]$ beacon intervals. When $A(\alpha)$ is projected to the modulo-$\alpha$ plane (as we are comparing $A(\alpha)$ with the traditional quorum system defined over the modulo-$\alpha$ plane), the station should remain $[\alpha/[(\alpha-1)/2]]=3$ every $\alpha$ beacon intervals in the worst cast, and the duty cycle is no more than $O(3/\alpha)=O(1/\alpha)$—an order less than that of traditional quorum system. The quorum size has order $O(1)$ over the modulo-$\alpha$ plane.

Figure 5B:
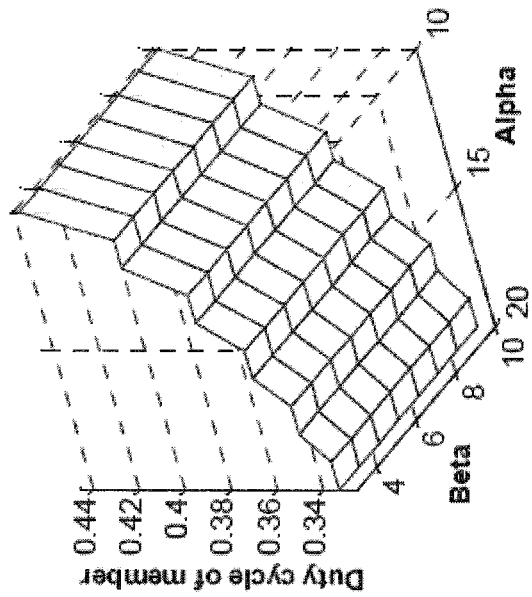
FIGS. 5A and 5B illustrate how $\alpha$ and $\beta$ may affect the duty cycle on a clusterhead or member.
Figure 5A:
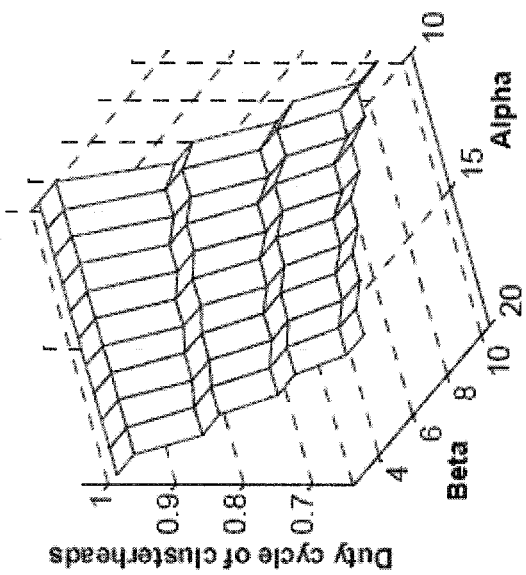

FIGS. 5A and 5B illustrate how $\alpha$ and $\beta$ may affect the duty cycle on a clusterhead or member. The larger the values of $\alpha$ and $\beta$ (i.e., the looser the requirements), the more the energy saving. Comparing FIGS. 5A and 5B we can see that when $\alpha$ becomes large, a member is able to sleep more by taxing slightly heavier duty cycle on its clusterhead. Since in a typical network members form the majority of vehicles, DSRC-AA enables substantial improvement in average energy efficiency.

As compared with the Grid scheme, AMQ offers at least the following advantages from combinatory perspective: First, Grid is symmetric, implying that all stations must wake up at least $O(\sqrt{n})$ beacon intervals per cycle; while AMQ requires member nodes to awake $O(1)$ beacon intervals per cycle, allowing power saving even when the cycle length n is forced to be small in vehicular networks. In addition, the cycle lengths of the Grid scheme must be a square and therefore all available candidates (e.g., 1, 4, or 9) may have value way below the optimal cycle length (e.g., 13) determined based on the delay requirements $\alpha$ and $\beta$. This results in unnecessarily high quorum ratio on each station. AMQ, on the other hand, generates the quorums directly based on these delay requirements and does not rely on any assumption upon the value of n, therefore, offers improved as well as tolerable energy efficiency on each station.

The exercise of power saving mode on an RSU may depend on its service type. RSUs running the transactional services, which require iterated interactions with vehicles, should remain active. This allows RSUs to discover each bypassing power saving vehicle (including clusterheads and members) within 1 beacon interval and maximize the communication time. RSUs running the broadcast services, on the other hand, can adopt s-quorums to discover the bypassing clusterheads (or other stations adopting s-quorums) within $\beta$ beacon intervals. After receiving the broadcast message, a clusterhead can forward the message to its members with the buffering delay at most 1 beacon interval.

Note the hidden terminal problem may impact DSRC-AA in both neighbor discovery time and data transmission delay when beacon and data frames respectively are interfered by the hidden nodes. Since beacon frames are usually small (under the RTS threshold), the impact on neighbor discovery may not be severe and can be mitigated by using the beacon backoff mechanism to avoid the collision of beacon frames. On the other hand, as the data transmission procedure of DSRC-AA follows the DCF mechanism, the interference between data frames can be mitigated by RTS and CTS frames, with the cost of backoff delay. If data transmission cannot start within a single beacon interval due to the DCF backoff, the sending station can may continue the backoff during the next awake beacon interval of the receiving station, and so forth.

Performance Guarantee in Asynchronous Vehicular Networks

Under the asynchronous conditions where the clocks shift between stations, the neighbor discovery time of symmetric and asymmetric links re less than $\beta \overline{BI}$ and $\alpha \overline{BI}$ respectively in DSRC-AA of the present disclosure in one embodiment.

Theorem 4.2: Two stations H0 and H1 adopting $S(\alpha, \beta)$ as the generating set are able to discover each other within $\beta$ beacon intervals despite their clock shifts.

Proof: Let $m=[(\alpha-1)/2]+[(\beta-1)/2]-1$ and $S=S(\alpha, \beta)$. Consider the starting time of an arbitrary beacon interval, t. Without loss of generality, assume H1's clock leads H0's clock by $l+\delta$ beacon intervals at t, where l is an integer and $0 \leq \delta < 1$.

Case 1: If $\delta=0$, let b be the number (of the current beacon interval) on H0 at t. With the clock shift l the number on H1 equals b'=(b-l) mod m. From Lemma 4.2, we know that $R_{m,\beta-1,b}(S)$ and $R_{m,\beta-1,b'}(S)$ intersect. Therefore H0 and H1 are able to receive one another's beacon frame within $\beta-1$ beacon intervals after t, less than $\beta$ beacon intervals.

Case 2: If $0<\delta<1$, let p be the number of the intersected beacon interval between $R_{m,\beta-1,b}(S)$ and $R_{m,\beta-1,b'}(S)$ and $t_s$ be the starting time of p on H0, as shown in FIG. 6. Recall in DSRCAA, H0 remains awake during the time interval $[t_s, t_s+\overline{BI}+\overline{AW}]$. Since a beacon frame must be broadcasted before the end of an ATIM window, H1 may transmit its beacon frame during the time interval $[t_s+\delta\overline{BI}, t_s+\overline{BI}+\overline{AW}]$. We have $[t_s+\delta\overline{BI}, t_s+\delta \overline{BI}+\overline{AW}] \subset [t_s, t_s+\overline{BI}+\overline{AW}]$. This implies that H0 is able to receive H1's beacon frame within $\beta-1+\delta$ beacon intervals after t, which is less than $\beta$ beacon intervals.

The proof of another direction that H1 is able to receive H0's beacon frame is similar to the above arguments (consider $\delta'=1-\delta$).

Theorem 4.3: Two stations H0 and H1 adopting $A(\alpha)$ and $S(\alpha, \beta)$ respectively as generating sets are able to discover each other within a beacon intervals despite their clock shifts.

Proof: The proof of this theorem is based on Lemma 4.1 and is analogous to that given in Theorem 4.2.

Recall that in DSRC-AA, a station must remain awake during the ATIM windows. The data buffering time is bounded by a $\overline{BI}$, which satisfies the delay requirements of data transmissions as discussed above. Additionally, with the above theorems ensuring the satisfactory neighbor discovery time, we can see that DSRC-AA renders great feasibility for vehicular networks since it improves the energy efficiency while giving the bounded delay.

FIG. 7A compares the duty cycles of $S(\alpha,\beta)$, Grid, and connected dominating set (CDS), where $\alpha$ and $\beta$ vary from 3 to 10. All the duty cycles are larger than 0.5, which gives limited effects on power saving. Note the Grid scheme, although having a smaller asymptotic quorum size than $S(\alpha, \beta)$ theoretically, results in the highest duty cycle because of its sparse configuration density—it produces quorums only when the cycle length is a square (or a compound). It can be seen that when the cycle length is forced to be small, configuration density is a major factor determining the energy efficiency.

FIG. 7B shows the duty cycles of $A(\alpha)$ where a varies from 3 to 20. For all values of $\alpha$, $A(\alpha)$ achieves duty cycle much smaller than CDS and Grid. The lower-bound of duty cycle in conventional quorum systems is also illustrated in FIG. 713. Since the quorum size of $A(\alpha)$ always equals 1, the duty cycle is not limited by the bound. From FIG. 7A and FIG. 7B, it can be seen that the improvement given by $A(\alpha)$ becomes significant when the difference between $\alpha$ and $\beta$ increases.

In one aspect, the methodology of the present disclosure may be implemented as a firmware as part of the MAC layer protocols in OBU and RSU chips. Thus, DSRC-AA may improve the energy efficiency at the MAC layer and may be compatible with most existing clustering schemes at the network or application layer. In addition, the power saving can be achieved at different layers with different techniques. For instance, proposed DSRC-AA protocol is orthogonal to the power saving efforts at either PHY layer (e.g., ultra low-power wakeup radios) or Routing/Application layers (e.g., itinerary-based message propagation).

DSRC-AA of the present disclosure in one aspect provides a new power saving protocol for vehicular networks, which improves the energy efficiency of stations (e.g., OBUs, portable devices, and RSUs) while guaranteeing the bounded delay. Utilizing the asymmetric, clustered vehicular network topology, DSRC-AA differentiates the awake/sleep schedules of nodes in a cluster and employs the AMQ scheme to define two types of cycle patterns for the members and clusterhead (or relays, RSUs) respectively. Members with the newly defined cycle patterns may have duty cycle below the $O(1/\sqrt{n})$ bound existing in most traditional AQPS protocols. Since members are the majority of nodes in vehicular networks, DSRC-AA allows substantial reduction in average energy consumption.

The constructions of cycle patterns are based on specific delay requirements $\alpha$ and $\beta$, which denote the maximum allowable neighbor discovery time in vehicle-to-vehicle and vehicle-to-roadside communications respectively. DSRC-AA, based on the newly defined cycle patterns, provides the asymmetric links for members to contact their clusterheads, and the symmetric links for clusterheads (or relays, RSUs) to communicate with each other. DSRC-AA ensures that: 1) each member using the asymmetric link can discover its clusterhead within $\alpha$ beacon intervals; 2) clusterheads using the symmetric links are able to discover each other within $\beta$ beacon intervals. The data buffering time in both types of links is less than 1 beacon interval. The power saving advantage of DSRC-AA comes with the performance guarantee. DSRC-AA, with a further generalized AMQ scheme, allows each member to dynamically adapt its cycle pattern according to its own delay requirement $\alpha$. This enables more power saving on members having slow relative moving speed to their clusterheads.

Simulation results showed that DSRC-AA is able to yield more than 44% reduction in average energy consumption as compared with the existing AQPS protocols. The power saving advantage of DSRC-AA is significant under light traffic load and high node mobility.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for an asymmetric and asynchronous energy conservation protocol for vehicular networks, comprising:
    defining an a-quorum for one or more members of a cluster, the cluster including a plurality of moving vehicles in a vehicular network and in which one or more of the plurality of moving vehicles are designated as a member, a cluster head, or a relay, the a-quorum specifying a beacon interval for one or more members of the cluster to establish asymmetric link to contact a cluster head of the cluster; and
    defining an s-quorum for the cluster head to establish symmetric link between the cluster head and one or more of other cluster heads in one or more other clusters.

2. The method of claim 1, wherein the cluster head adopts the s-quorum to establish symmetric link between the cluster head and the relay.

3. The method of claim 1, wherein the a-quorum is defined as having a cardinality of one.

4. The method of claim 1, wherein the a-quorum is defined as being 0-th beacon interval.

5. The method of claim 1, wherein the one or more members adopting the a-quorum is bounded by a delay requirement $\alpha$.

6. The method of claim 1, wherein the s-quorum is defined as $S(\alpha,\beta)=\{0, 1, \ldots, [(\alpha-1)/2]-1\}$,
    wherein a denotes neighbor discover time in beacon intervals for vehicle-to-vehicle asymmetric links, $\beta$ denotes neighbor discovery time in beacon intervals for vehicle-to-vehicle symmetric links.

7. The method of claim 1, wherein the cardinality of a-quorum equals one and is independent of the neighbor discover times for vehicle-to-vehicle asymmetric and symmetric links.

8. The method of claim 1, wherein different cycle patterns are formed on different vehicles of the plurality of vehicles.

9. The method of claim 1, wherein the members of the cluster form cycle patterns based on a set of the a-quorum.

10. The method of claim 1, wherein the cluster head, the relay, and one or more roadside units (RSUs) form cycle patterns based on the s-quorum.

11. The method of claim 1, wherein the a-quorum is defined as $A(\alpha)=\{0\}$ and the s-quorum is defined as $S(\alpha,\beta)=\{0, 1, \ldots, [(\alpha-1)/2]-1\}$, wherein $\alpha$ denotes neighbor discover time in beacon intervals for vehicle-to-vehicle asymmetric links, $\beta$ denotes neighbor discovery time in beacon intervals for vehicle-to-vehicle symmetric links, and wherein the member remains awake during a beacon interval specified in $A(\alpha)$ and the cluster head and the relay remain awake during a beacon interval specified in $S(\alpha,\beta)$.

12. The method of claim 11, wherein the one or more members broadcast their beacon frames carrying information about awake and sleep schedule during ATIM windows.

13. The method of claim 12, wherein one or more members transmit data based on the information.

14. A program storage device readable by a machine, tangibly embodying a program of instructions executable by the machine to pertain a method of an asymmetric and asynchronous energy conservation protocol for vehicular networks, comprising:
    defining an a-quorum for one or more members of a cluster, the cluster including a plurality of moving vehicles in a vehicular network and in which the plurality of moving vehicles are designated as a member, a cluster head, or a relay, the a-quorum specifying a beacon interval for one or more members of the cluster to establish asymmetric links to contact a cluster head of the cluster; and
    defining an s-quorum for the cluster head to establish symmetric link between the cluster head and one or more of other cluster heads in one or more other clusters.

15. The program storage device of claim 14, wherein the cluster head adopts the s-quorum to establish symmetric link between the cluster head and the relay.

16. The program storage device of claim 14, wherein the a-quorum is defined as having a cardinality of one.

17. The program storage device of claim 14, wherein the a-quorum is defined as being 0-th beacon interval.

18. The program storage device of claim 14, wherein the one or more members adopting the a-quorum is bounded by a delay requirement $\alpha$.

19. The program storage device of claim 14, wherein the s-quorum is defined as $$S(\alpha,\beta)=\{0, 1, \ldots, [(\alpha-1)/2]-1\},$$

wherein $\alpha$ denotes neighbor discover time in beacon intervals for vehicle-to-vehicle asymmetric links, $\beta$ denotes neighbor discovery time in beacon intervals for vehicle-to-vehicle symmetric links.

20. A system for an asymmetric and asynchronous energy conservation protocol for vehicular networks, comprising:
means for defining an a-quorum for one or more members of a cluster, the cluster including a plurality of moving vehicles in a vehicular network and in which the plurality of moving vehicles are designated as a member, a cluster head, or a relay, the a-quorum specifying a beacon interval for one or more members of the cluster to establish asymmetric links to contact a cluster head of the cluster; and
means for defining an s-quorum for the cluster head to establish symmetric link between the cluster head and one or more of other cluster heads in one or more other clusters.

21. The system of claim 20, wherein the cluster head adopts the s-quorum to establish symmetric link between the cluster head and the relay.

22. The system of claim 20, wherein the a-quorum is defined as having a cardinality of one.

23. The system of claim 20, wherein the a-quorum is defined as being 0-th beacon interval.

24. The system of claim 20, wherein the one or more members adopting the a-quorum is bounded by a delay requirement $\alpha$.

25. The system of claim 20, wherein the s-quorum is defined as $S(\alpha,\beta)=\{0, 1, \ldots, [(\alpha-1)/2]-1\}$, wherein $\alpha$ denotes neighbor discover time in beacon intervals for vehicle-to-vehicle asymmetric links, $\beta$ denotes neighbor discovery time in beacon intervals for vehicle-to-vehicle symmetric links.

26. A system for an asymmetric and asynchronous energy conservation protocol for vehicular networks, comprising:
a plurality of stations associated with respective one or more vehicles in a vehicular network, the plurality of stations being organized into one or more clusters, and assigned as one of a member, cluster head, or relay in a respective cluster;
an a-quorum specifying a beacon interval for one or more members of a cluster to establish asymmetric links to contact a cluster head of the cluster; and
an s-quorum for the cluster head to establish symmetric link between the cluster head and one or more of other cluster heads in one or more other clusters.

27. The system of claim 26, wherein the cluster head adopts the s-quorum to establish symmetric link between the cluster head and the relay.

28. The system of claim 26, wherein the a-quorum is defined as having a cardinality of one.

29. The system of claim 26, wherein the a-quorum is defined as being 0-th beacon interval.

30. The system of claim 26, wherein the s-quorum is defined as $$S(\alpha,\beta)=\{0, 1, \ldots, [(\alpha-1)/2]-1\},$$

wherein $\alpha$ denotes neighbor discover time in beacon intervals for vehicle-to-vehicle asymmetric links, $\beta$ denotes neighbor discovery time in beacon intervals for vehicle-to-vehicle symmetric links.

* * * * *